(12) United States Patent
Ishii (10) Patent No.: US 8,792,021 B2
(45) Date of Patent: Jul. 29, 2014

(54) IMAGE CAPTURING APPARATUS AND CONTROL METHOD FOR THE SAME

(75) Inventor: Mie Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/255,923

(22) PCT Filed: Mar. 31, 2010

(86) PCT No.: PCT/JP2010/056275
§ 371 (c)(1), (2), (4) Date: Sep. 12, 2011

(87) PCT Pub. No.: WO2010/131533
PCT Pub. Date: Nov. 18, 2010

(65) Prior Publication Data
US 2012/0044390 A1    Feb. 23, 2012

(30) Foreign Application Priority Data

May 11, 2009    (JP) .................................. 2009-114979

(51) Int. Cl.
H04N 9/64    (2006.01)
(52) U.S. Cl.
USPC .......................................... 348/241; 348/246
(58) Field of Classification Search
USPC ................................................ 348/241, 246
See application file for complete search history.

(56) References Cited

U.S. PATENT DOCUMENTS

| | | | | |
|---|---|---|---|---|
| 7,113,210 | B2 * | 9/2006 | Bloom | 348/243 |
| 7,777,793 | B2 * | 8/2010 | Kitani | 348/251 |
| 2001/0028392 | A1 * | 10/2001 | Yamamoto et al. | 348/207 |
| 2005/0099505 | A1 * | 5/2005 | Suzuki | 348/222.1 |
| 2006/0006426 | A1 * | 1/2006 | Inaba | 257/223 |
| 2006/0232692 | A1 * | 10/2006 | Takane | 348/248 |

FOREIGN PATENT DOCUMENTS

| | | |
|---|---|---|
| CN | 1617571 A | 5/2005 |
| CN | 1719877 A | 1/2006 |
| JP | 07-067038 A | 3/1995 |
| JP | 2005-167918 A | 6/2005 |
| JP | 2006-121478 A | 5/2006 |

(Continued)

OTHER PUBLICATIONS

Aug. 23, 2013 Japanese Office Action that issued in Japanese Patent Application No. 2009-114979.

(Continued)

Primary Examiner — Twyler Haskins
Assistant Examiner — Fayez Bhuiyan
(74) Attorney, Agent, or Firm — Cowan, Liebowitz & Latman, P.C.

(57) ABSTRACT

An image capturing apparatus includes an image sensor having an effective pixel area composed of effective pixels that photoelectrically convert an object image and a reference pixel area composed of reference pixels that output pixel signals to be a reference; a first calculation unit that calculates a standard deviation of the pixel signals output from the reference pixel area; a second calculation unit that calculates an integrated value of the pixel signals output from the reference pixel area; a third calculation unit that calculates a correction value for correcting pixel signals output from the effective pixel area, with use of the integrated value; a correction unit that corrects the pixel signals output from the effective pixel area, based on the correction value; and a determination unit that determines whether correction is to be performed by the correction unit, according to the standard deviation.

5 Claims, 7 Drawing Sheets

(56) References Cited

FOREIGN PATENT DOCUMENTS

| JP | 2007-027845 A | 2/2007 |
| JP | 2007-201735 A | 8/2007 |
| JP | 2008-067060 A | 3/2008 |
| JP | 2009-081528 A | 4/2009 |
| WO | 2007-111264 A | 10/2007 |

OTHER PUBLICATIONS

Sep. 29, 2013 Chinese Office Action that issued in Chinese Patent Application No. 201080020918.2.

* cited by examiner

IMAGE CAPTURING APPARATUS AND CONTROL METHOD FOR THE SAME

CROSS-REFERENCE TO RELATED APPLICATIONS

This application is a national stage application of International Application No. PCT/JP2010/056275, filed Mar. 31, 2011, whose benefit is claimed and which claims the benefit of Japanese Patent Application No. 2009-114979, filed May 11, 2009, the entire disclosures of which are incorporated herein by reference.

TECHNICAL FIELD

The present invention relates to noise correction in an image capturing apparatus, and in particular relates to the correction of stripe noise.

BACKGROUND ART

In recent years, CMOS image sensors have often been used in digital single-lens reflex cameras and video cameras. An increase in the number of pixels, an increase in image capturing speed, and an increase in ISO speed (an improvement of sensitivity) have been required for such CMOS image sensors.

Pixel size tends to become smaller due to an increase in the number of pixels, and this means that less electric charge can be accumulated in each pixel. Meanwhile, in order to accommodate an increase in ISO speed, a larger gain needs to be applied to the obtained electric charge. Although the original optical signal component is amplified when gain is applied, noise generated by circuits and the like is also amplified, and therefore high ISO speed images have more random noise than low ISO speed images.

Also, one method of realizing high-speed image capturing is multichannelization in which the image sensor is provided with a plurality of output paths, and readout is performed simultaneously for a plurality of pixels. However, since the amount of noise varies depending on the output path, there is the problem that the amount of noise differs for each CH (for each channel).

Figure 9:
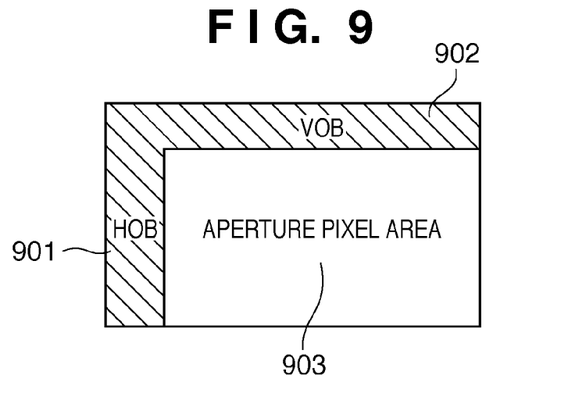
FIG. 9 is a diagram showing an overall layout of the CMOS image sensor.

Below is a description of the configuration of a CMOS image sensor and the cause of noise generation. FIG. 9 shows an overall layout of the CMOS image sensor. As shown in FIG. 9, the CMOS image sensor includes an aperture pixel area (effective pixel area) 903 having aperture pixels (effective pixels), and a vertical optical black area (VOB, first reference pixel area) 902 and a horizontal optical black area (HOB, second reference pixel area) 901 that have shielded pixels (reference pixels). The HOB 901 is provided adjacent to the head (on the left side) of the aperture pixel area 903 in the horizontal direction, and is an area shielded so that light does not enter. Also, the VOB 902 is provided adjacent to the head (on the top side) of the aperture pixel area 903 in the vertical direction, and is an area shielded so that light does not enter. The aperture pixel area 903 and the optical black areas 901 and 902 have the same structure, and the aperture pixel area 903 is not shielded, whereas the optical black areas 901 and 902 are shielded. Hereinafter, the pixels in the optical black areas are called OB pixels. Normally, OB pixels are used to obtain a reference signal whose signal level is a reference, that is to say a black reference signal. The aperture pixels of the aperture pixel area 903 each accumulate an electric charge generated according to incident light, and output the electric charge.

Figure 10:
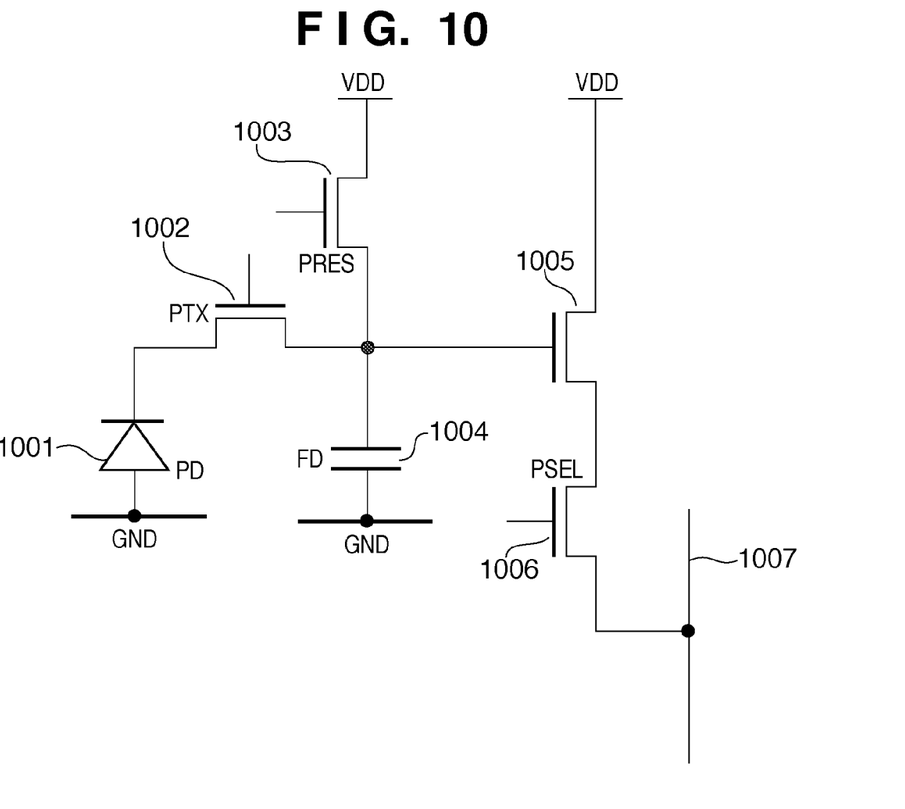
FIG. 10 is a diagram showing an example of a circuit of a unit pixel (corresponding to one pixel) in the CMOS image sensor.

FIG. 10 shows an example of a circuit of a unit pixel (corresponding to one pixel) in the CMOS image sensor. A photodiode (hereinafter, called a PD) 1001 receives an optical image formed by an imaging lens, generates an electric charge, and accumulates the electric charge. Reference numeral 1002 indicates a transfer switch that is configured by a MOS transistor. Reference numeral 1004 indicates a floating diffusion (hereinafter, called an FD). The electric charge accumulated by the PD 1001 is transferred to the FD 1004 via the transfer MOS transistor 1002, and then converted to a voltage and output from a source follower amplifier 1005. Reference numeral 1006 indicates a selection switch that collectively outputs one row-worth of pixel signals to a vertical output line 1007. Reference numeral 1003 indicates a reset switch that, with use of a power source VDD, resets the potential of the FD 1004, and resets the potential of the PD 1001 via the transfer MOS transistor 1002.

Figure 11:
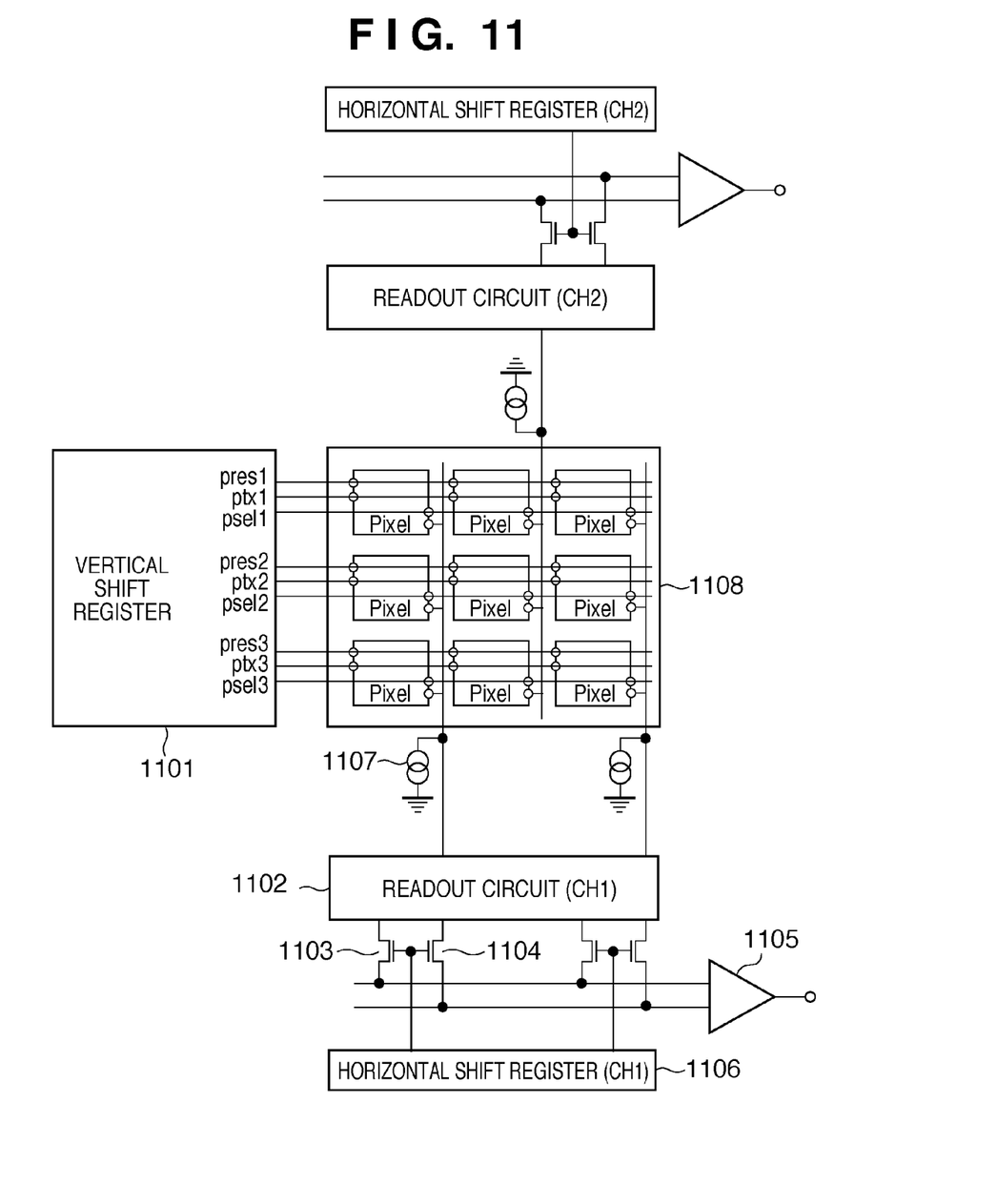
FIG. 11 is a block diagram showing an exemplary configuration of a CMOS image sensor.

FIG. 11 is a block diagram showing an exemplary configuration of a CMOS image sensor. Note that although FIG. 11 shows a 3×3 pixel configuration, normally the number of pixels is high, such as several millions or several tens of millions. A vertical shift register 1101 outputs signals from row select lines Pres1, Ptx1, Psel1, and the like to a pixel area 1108. The pixel area 1108 has the configuration shown in FIG. 9, and has a plurality of pixel cells Pixel. Even-numbered columns and odd-numbered columns of the pixel cells Pixel output pixel signals to vertical signal lines of a CH1 and a CH2 respectively. A constant current source 1107 is connected as a load to the vertical signals lines. A readout circuit 1102 receives an input of a pixel signal from a vertical signal line, outputs the pixel signal to a differential amplifier 1105 via an n-channel MOS transistor 1103, and outputs a noise signal to the differential amplifier 1105 via an n-channel MOS transistor 1104. A horizontal shift register 1106 controls the switching on/off of the transistors 1103 and 1104, and the differential amplifier 1105 outputs a difference between the pixel signal and the noise signal. Note that although the output path configuration in FIG. 11 is a two-channel configuration including CH1 and CH2, high-speed processing is made possible by increasing the number of output paths. For example, if a total of eight output paths (in other words, four output paths both above and below in the image sensor configuration) are provided, eight pixels can be processed at the same time.

Using the differential amplifier described above enables obtaining an output signal from which noise unique to the CMOS image sensor has been removed. However, if there is variation between the characteristics of the output amplifiers of CH1 and CH2, a substantially uniform level difference occurs in each column. This is called vertical pattern noise.

Meanwhile, the pixels have a common power source and GND. If the power source and GND fluctuate during a readout operation, the pixels read out at that time have a substantially uniform level difference. Normally, readout is performed in an image sensor row-by-row, from left to right, beginning at the top left of the screen. The level difference occurring due to fluctuation of the power source and the GND appears as a different level difference for substantially each row. This is called horizontal pattern noise.

As described above, there is the problem that stripe noise occurs due to the structure of the CMOS image sensor, and this stripe noise tends to be more prominent as the specifications are improved. Since the vertical pattern noise is unique pattern noise determined by the characteristics of the output amplifiers, correction can be performed by correcting variations in each output amplifier. On the other hand, if the fluctuation of the power source and the GND is random, the horizontal pattern noise also becomes random.

As a technique for correcting such random pattern noise, Japanese Patent Laid-Open No. 7-67038 discloses a method of calculating a line average value for pixel signals of OB pixels, and subtracting the line average value from the pixel signals of aperture pixels in that row.

However, in an image that has a large amount of random noise, calculating a correction value for correcting stripe noise is difficult. This is pointed out in Japanese Patent Laid-Open No. 7-67038, Japanese Patent Laid-Open No. 2005-167918, and the like as well. According to Japanese Patent Laid-Open No. 2005-167918, if the stripe noise is reduced to from 1/8 to 1/10 of the random noise, the stripe noise becomes buried in the random noise, and thus becomes difficult to see. In view of this, Japanese Patent Laid-Open No. 2005-167918 discloses a method in which noise is mitigated by adding random noise.

However, with the correction method of subtracting the line average value of pixel signals of OB pixels, there are often cases in which the correction is insufficient, such as the case in which stripe noise occurs due to under-correction and over-correction. This phenomenon can often be seen in images containing a large amount of random noise, such as images captured at a high ISO speed. As the amount of random noise in an image rises, more OB pixels are necessary to obtain a proper correction value. Also, even given that the stripe noise is difficult to see if it is 1/8 to 1/10 or less of the random noise value as disclosed in the above-mentioned Japanese Patent Laid-Open No. 2005-167918, calculating a correction value such that the stripe noise becomes difficult to see necessitates approximately 400 or more OB pixels per row. However, allocating 400 columns or more to OB pixels in the layout of the CMOS image sensor cannot be said to be practical in view of the requirement for an increase in the number of pixels and high-speed imaging.

SUMMARY OF INVENTION

The present invention has been achieved in light of the issues described above, and enables effectively correcting horizontal stripe noise even in the case in which there are few reference pixels.

According to a first aspect of the present invention, an image capturing apparatus includes: an image sensor having an effective pixel area composed of effective pixels that photoelectrically convert an object image, and a reference pixel area composed of reference pixels that output pixel signals to be a reference; a correction means for correcting pixel signals output from the effective pixel area with use of a correction value calculated based on the pixel signals output from the reference pixel area; and a determination means for determining whether correction is to be performed by the correction means, in accordance with values of a statistical measure of the pixel signals output from the reference pixel area.

Also, according to a second aspect of the present invention, a control method for an image capturing apparatus is a control method for an image capturing apparatus provided with an image sensor having an effective pixel area composed of effective pixels that photoelectrically convert an object image, and a reference pixel area composed of reference pixels that output pixel signals to be a reference, the control method including the steps of: calculating values of a statistical measure of the pixel signals output from the reference pixel area; calculating a correction value for correcting pixel signals output from the effective pixel area, based on the pixel signals output from the reference pixel area; correcting the pixel signals output from the effective pixel area with use of the correction value; and determining whether correction is to be performed in the correction step, according to the values of a statistical measure.

Further features of the present invention will become apparent from the following description of exemplary embodiments with reference to the attached drawings.

DESCRIPTION OF EMBODIMENTS

Below is a detailed description of embodiments of the present invention with reference to the drawings.

Embodiment 1

Figure 1:
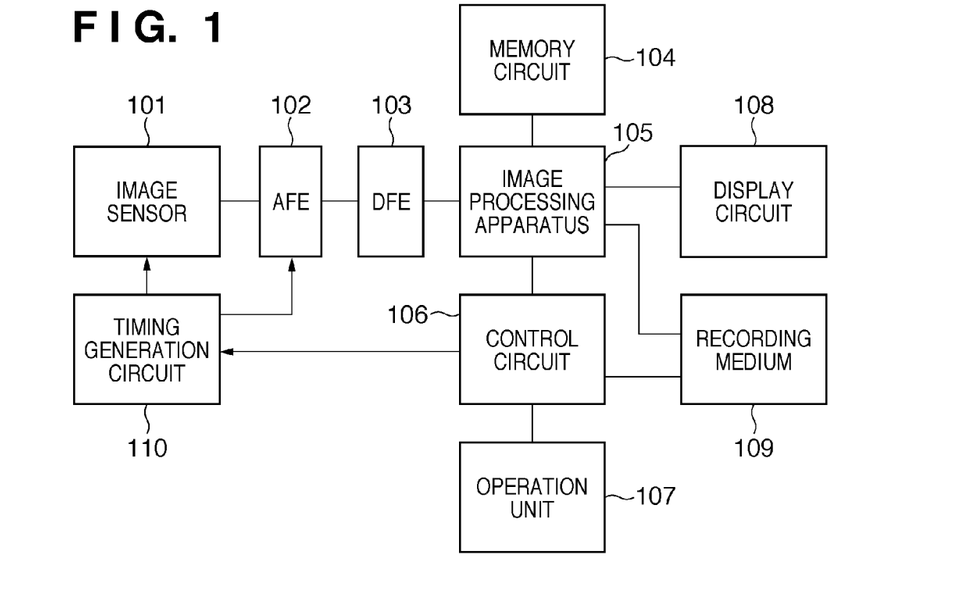
FIG. 1 is an overall block diagram showing a configuration of an image capturing apparatus according to Embodiment 1 of the present invention.

FIG. 1 is an overall block diagram showing a configuration of an image capturing apparatus according to Embodiment 1 of the present invention. In FIG. 1, an image sensor 101 is a CMOS image sensor that photoelectrically converts an object image formed by an imaging lens (not shown). An AFE 102 is an analog front end, which is a signal processing circuit that performs amplification, black level adjustment (OB clamp), and the like on signals from the image sensor 101. The AFE 102 receives an OB clamp timing, an OB clamp target level, and the like from a timing generation circuit 110, and performs processing in accordance with these. The AFE 102 also converts processed analog signals into digital signals. A DFE 103 is a digital front end that receives digital signals of pixels obtained by the conversion performed by the AFE 102, and performs digital processing such as image signal correction and pixel rearrangement. Reference numeral 105 indicates an image processing apparatus that performs developing processing, and also processing such as displaying an image on a display circuit 108 and recording an image to a recording medium 109 via a control circuit 106. Note that the control circuit 106 also receives instructions from a control unit 107 and performs control such as sending instructions to the timing generation circuit 110. Also, a CompactFlash (registered trademark) memory or the like is used as the recording medium 109. A memory circuit 104 is used as a work memory in the developing stage in the image processing apparatus 105. The memory circuit 104 is also used as a buffer memory for when image capturing is performed in succession and developing processing is not completed on time. The control unit 107 includes, for example, a power source switch for starting a digital camera, and a shutter switch that instructs the start of imaging preparation operations such as photometric processing and ranging processing, and the start of a series of image capturing operations for driving a mirror and a shutter, processing signals read out from the image sensor 101, and writing the resulting signals to the recording medium 109.

The configurations of pixel areas of the image sensor 101 are similar to the configurations in FIG. 9, and specifically the image sensor 101 includes an aperture pixel area (effective pixel area) 903 having aperture pixels (effective pixels), and a vertical optical black area (VOB, first reference pixel area) 902 and a horizontal optical black area (HOB, second reference pixel area) 901 that have shielded pixels (reference pixels) that are shielded such that light does not enter.

Figure 2:
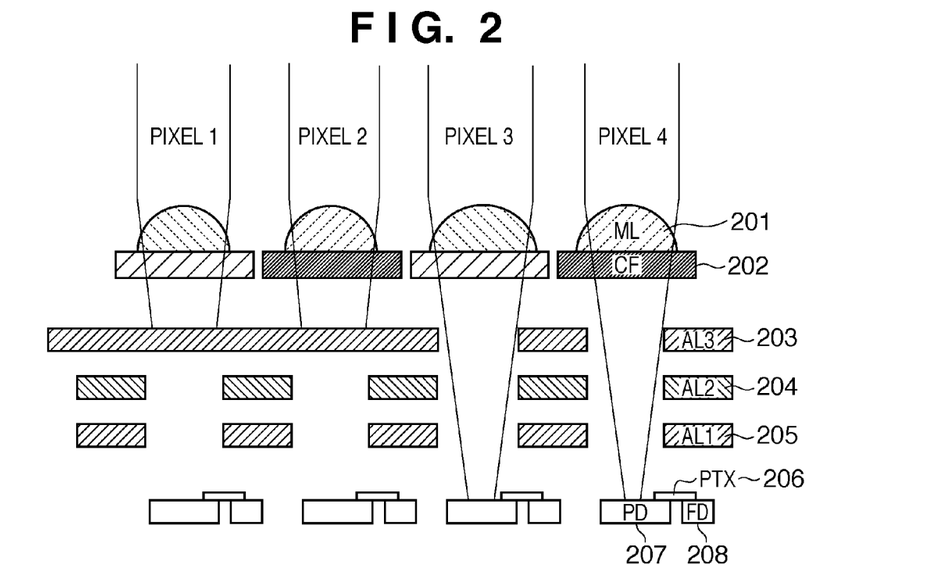
FIG. 2 is a cross-sectional view of a CMOS image sensor.

FIG. 2 is a cross-sectional view of the CMOS image sensor. An AL1, an AL2, and an AL3 (205, 204, and 203 in FIG. 2) are wiring layers, and are configured by aluminum or the like. The AL3 (203) is also used for light shielding, and a pixel 1 and a pixel 2, which are OB pixels, are shielded by the AL3. A pixel 3 and a pixel 4, however, are not shielded by the AL3, and are aperture pixels. MLs (201) are microlenses that converge light onto photodiodes PD (207). CFs (202) are color filters. PTXs (206) are transfer switches that transfer electric charge accumulated in the PDs (207) to FDs (208).

The circuit configuration of a unit pixel (corresponding to one pixel) of the CMOS image sensor according to the present embodiment is similar to the configuration in FIG. 10, and therefore a detailed description thereof has been omitted. The overall configuration of the CMOS image sensor according to the present embodiment is similar to the configuration in FIG. 11.

The gate of a transfer MOS transistor 1002 in FIG. 10 is connected to a first row select line Ptx1 (FIG. 11) disposed extending in the horizontal direction. The gates of similar transfer MOS transistors 1002 of other pixel cells Pixel disposed in the same row are also connected to the first row select line Ptx1 in common. The gate of a reset MOS transistor 1003 in FIG. 10 is connected to a second row select line Pres1 (FIG. 11) disposed extending in the horizontal direction. The gates of similar reset MOS transistors 1003 of other pixel cells Pixel disposed in the same row are also connected to the second row select line Pres1 in common. The gate of a select MOS transistor 1006 in FIG. 10 is connected to a third row select line Psel1 disposed extending in the horizontal direction. The gates of similar select MOS transistors 1006 of other pixel cells Pixel disposed in the same row are also connected to the third row select line Psel1 in common, and the first to third row select lines Ptx1, Pres1, and Psel1 are connected to a vertical shift register 1101, and are thus driven.

Pixel cells Pixel and row select lines having a similar configuration are provided in the remaining rows shown in FIG. 11 as well. These row select lines include row select lines Ptx2 and Ptx3, Pres2 and Pres3, and Psel2 and Psel3, which are formed by the vertical shift register 1101.

The source of the select MOS transistor 1006 is connected to a terminal Vout of a vertical signal line disposed extending in the vertical direction. The source of similar select MOS transistors 1006 of pixel cells Pixel disposed in the same column is also connected to the terminal Vout of the vertical signal line. In FIG. 11, the terminal Vout of the vertical signal line is connected to a constant current source 1107, which is a load.

Figure 3:
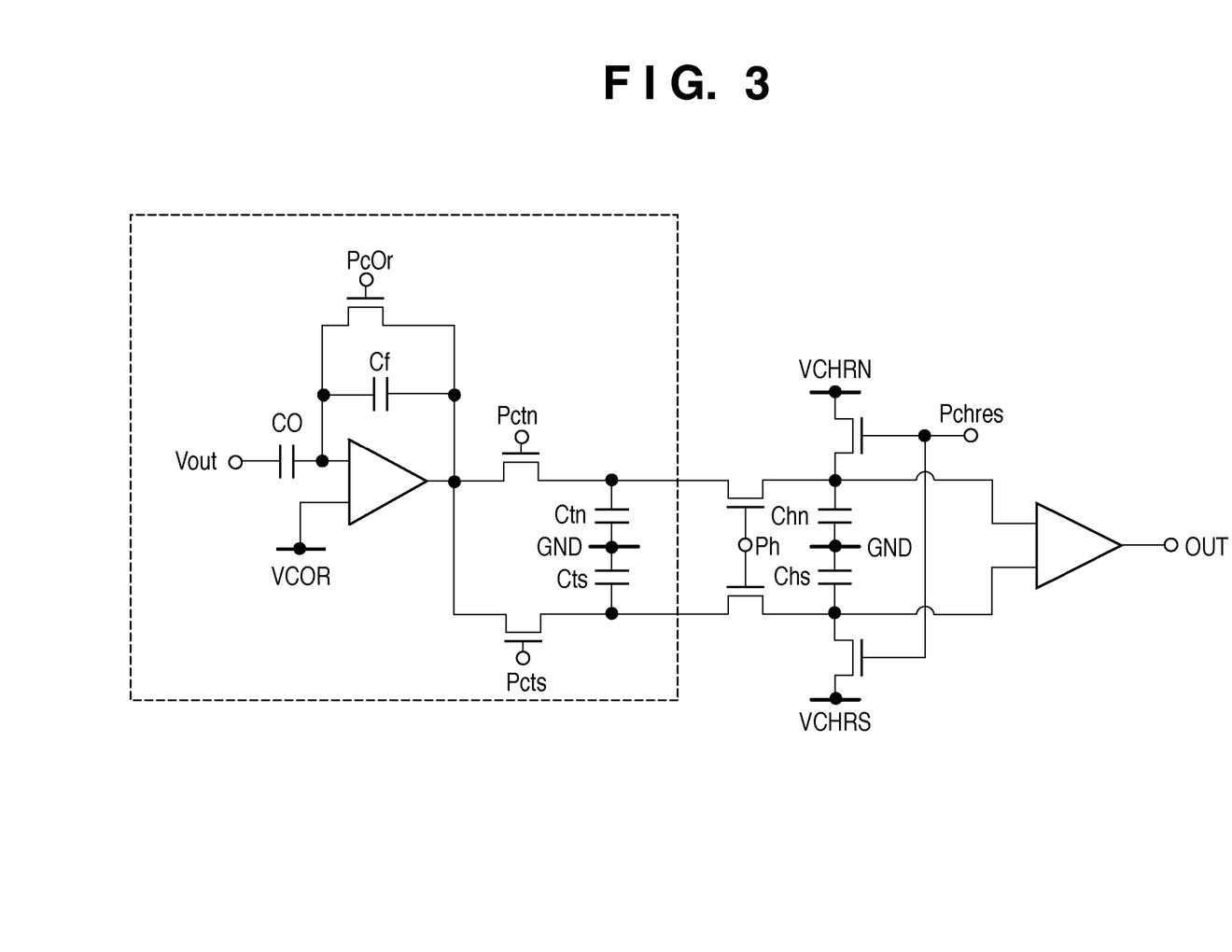
FIG. 3 is a diagram showing an example of a circuit corresponding to one column in a readout circuit block shown in FIG. 5.

FIG. 3 is a diagram showing an example of a circuit corresponding to one column in the readout circuit 1102 block shown in FIG. 11. The portion enclosed in dashed lines is the portion corresponding to the column, and the terminal Vout is connected to each vertical signal line.

Figure 4:
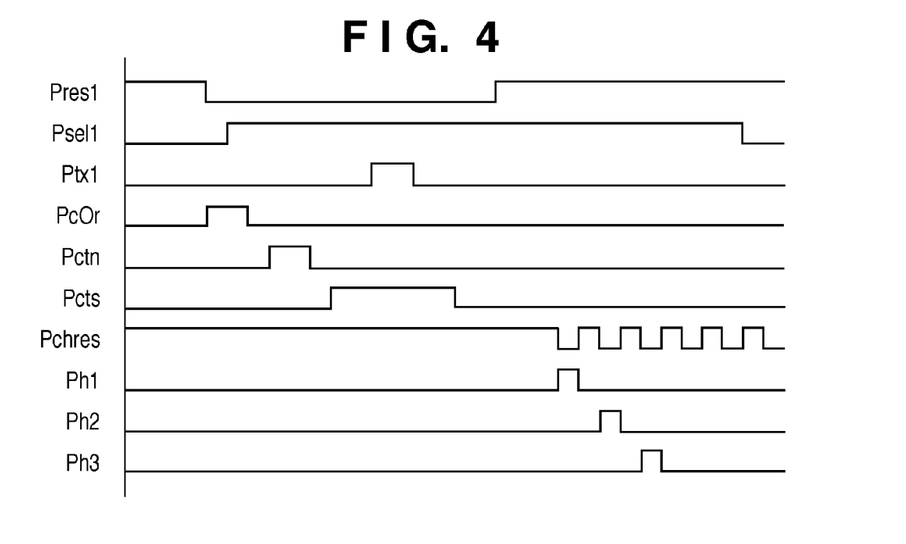
FIG. 4 is a timing chart showing an example of operations performed by the CMOS image sensor.

FIG. 4 is a timing chart showing an example of operations performed by the CMOS image sensor. The gate line Pres1 of the reset MOS transistor 1003 changes to the high level prior to the readout of the signal electric charge from the photodiode 1001. Accordingly, the gate of the amplification MOS transistor is reset to a reset power source voltage. At the same time as the gate line Pres1 of the reset MOS transistor 1003 returns to the low level, a gate line Pc0r (FIG. 3) of a clamp switch changes to the high level, and thereafter the gate line Psel1 of the select MOS transistor 1006 changes to the high level. Accordingly, reset signals (noise signals) having reset noise superimposed thereon are read out to the vertical signal line Vout, and clamped by clamp capacitors C0 in the columns. Next, the gate line Pc0r of the clamp switch returns to the low level, and thereafter a gate line Pctn of a transfer switch on the noise signal side changes to the high level, and the reset signals are held in noise holding capacitors Ctn provided in the columns. Next, a gate line Pcts of a transfer switch on the pixel signal side is changed to the high level, and thereafter the gate line Ptx1 of the transfer MOS transistor 1002 changes to the high level, and the signal electric charge of the photodiode 1001 is transferred to the gate of a source follower amplifier 1005 and also read out to the vertical signal line Vout at the same time. Next, the gate line Ptx1 of the transfer MOS transistor 1002 returns to the low level, and thereafter the gate line Pcts of the transfer switch on the pixel signal side changes to the low level. Accordingly, changed portions (optical signal components) from the reset signals are read out to signal holding capacitors Cts provided in the columns. As a result of the operations up to this point, the signal electric charges of the pixels Pixel connected in the first row are held in the signal holding capacitors Ctn and Cts connected in the respective columns.

Next, the gates of horizontal transfer switches in the columns sequentially change to the high level in accordance with signals Ph supplied from a horizontal shift register 1106. The voltages held in the signal holding capacitors Ctn and Cts are sequentially read out by horizontal output lines Chn and Chs, difference processing is performed thereon by an output amplifier, and the resulting signals are sequentially output to an output terminal OUT. During the signal readout performed in each column, the horizontal output lines Chn and Chs are reset to reset voltages VCHRN and VCHRS by a reset switch. This completes the readout of the pixel cells Pixel connected in the first row. Subsequently, in a similar manner, the signals of the pixel cells Pixel connected in the second row and rows thereafter are sequentially read out in accordance with signals from the vertical shift register 1101, and thus the readout of all the pixel cells Pixel is completed.

Figure 5:
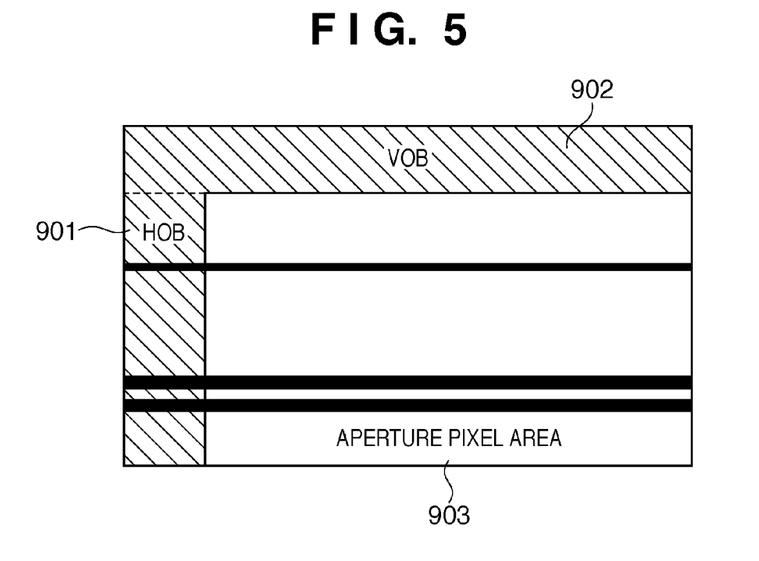
FIG. 5 is a diagram showing an example of an image obtained by the image capturing apparatus.

FIG. 5 shows an example of images obtained by the processing described above. There is a time difference between Pctn and Pcts, and if the power source and GND fluctuate during such time, the signal level of the entire row uniformly changes. Horizontal stripe noise appears since such fluctuation is different for each row. Since more gain is supplied when high ISO speed imaging is performed (when high sensitivity imaging is performed), the noise is also amplified, and therefore the horizontal stripe noise becomes prominent.

Figure 6:
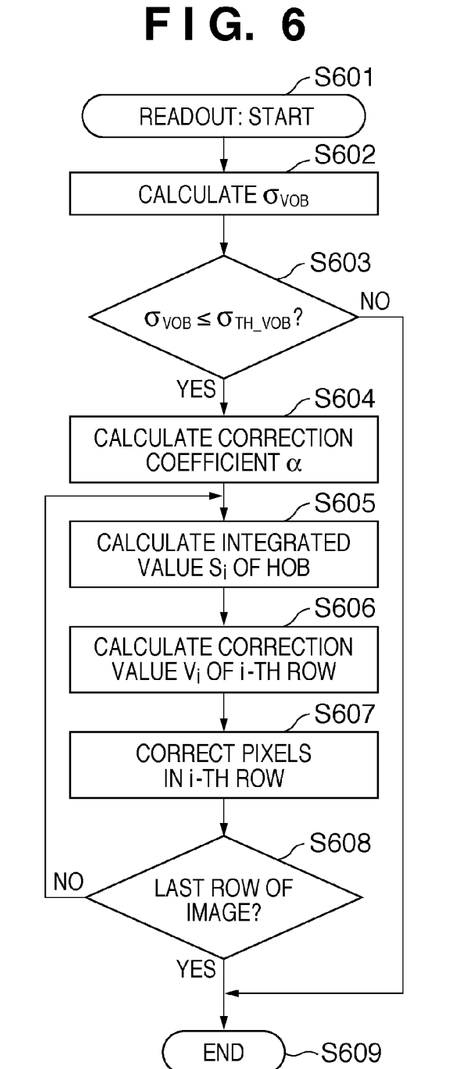
FIG. 6 is flowchart of horizontal stripe noise correction processing according to Embodiment 1 of the present invention.

FIG. 6 is flowchart of horizontal stripe noise correction processing according to Embodiment 1 of the present invention. The following is a description of the stripe noise correction method according to the present embodiment with reference to this flowchart. Note that the description in the present embodiment is based on the assumption that correction is performed after acquiring an image that has not been developed yet. The correction value and correction coefficient that appear in the following description are defined as follows. The correction value is a value obtained from HOB signals for each row, and the pixels in each row are corrected in accordance with expressions that are described later. Here, the correction coefficient is defined as a coefficient by which a shift amount is multiplied, where the shift amount is an amount of shift from a black reference value calculated from the HOB signals.

First, readout is started in step S601. The readout is performed from left to right row-by-row, starting at the upper left of the pixel configuration layouts shown in FIGS. 5 and 9. The VOB area is provided at the top of the screen in the pixel configurations in FIGS. 5 and 9, and first a standard deviation $\sigma_{VOB}$ of pixel signals output from the VOB area is calculated (step S602) (first calculation step). Although the pixel area targeted for calculation may be any area as long as OB pixels are included, it is better for the calculation to be performed using pixel signals from as many pixels as possible (first predetermined area) in order to properly determine the state of the image. As a result of selecting many pixels as the area, $\sigma_{VOB}$ is substantially equal to the standard deviation $\sigma$ of the overall image (The same applies to $\sigma_{HOB}$ as well. In other words, $\sigma_{OB} \approx \sigma_{HOB} \sigma$ of overall image.).

Next, in step S603 a determination is made as to whether correction is to be performed, based on the calculated value of $\sigma_{VOB}$. If $\sigma_{VOB}$ is less than or equal to $\sigma_{th\_VOB}$, which is a threshold value set in advance, processing proceeds to step S604, and correction is performed. If $\sigma_{VOB}$ is greater than $\sigma_{th\_VOB}$, processing proceeds to step S609, and correction is not executed. The reason for this is that if $\sigma$ of the image (here, $\sigma_{VOB}$) is high, properly obtaining the correction value is difficult, and there is the risk of performing erroneous correction, that is to say, increasing the amount of noise.

If $\sigma_{VOB}$ is less than or equal to the threshold value, processing proceeds to step S604. A correction coefficient $\alpha$ is determined according to the value of $\sigma_{VOB}$. Normally, since erroneous correction tends to be performed when the amount of shift from the black reference value calculated from the HOB signals is set as the correction value, a favorable correction result is obtained by setting the correction coefficient to a value of 1 or less, determining the correction value, and then executing correction. In particular, there is a stronger tendency for over-correction to be performed as the number of columns in the HOB decreases, or as the amount of random noise in the image increases. In other words, it is desirable for $\alpha$ to be lower as $\sigma_{VOB}$ is higher (A). For example, if $\sigma_{VOB}$ is 40, then $\alpha$ is set to 0.5, and if $\sigma_{VOB}$ is 20, $\alpha$ is set to 0.7. Furthermore, the correction coefficient $\alpha$ may be caused to reflect the width of the HOB as well (B). For example, in the case in which $\sigma_{VOB}$ is 40, $\alpha$ can be set to 0.5 if the width of the HOB is 100, and to 1.0 if the width of the HOB is 400. The correction coefficient $\alpha$ may be a table or function in the case of (A) and (B).

In step S605, in order to determine the correction value for an i-th row, an integrated value $S_i$ of pixel signals output from the HOB (second predetermined area) is calculated (i being a vertical coordinate) (second calculation step). Since correction only needs to be performed for effective pixels, step S605 may begin to be executed when the readout row reaches the effective pixel area. Also, in the case in which there are multiple channels as the output paths as in FIG. 11, an integrated value of pixel signals output from the HOB may be calculated for each output path, or since horizontal stripes are constant for each row regardless of the CH (channel) and color, an integrated value of all pixel signals output from HOB pixels in a row, regardless of the output path, may be calculated. Alternatively, in consideration of simplifying the calculation and the like, an integrated value may be calculated for each of the colors R, G, and B.

Next, in step S606 a correction value $V_i$ for the i-th row is determined (i being a vertical coordinate). The correction value is calculated according to expression (1) (third calculation step). Specifically, an average value is calculated by dividing the integrated value calculated in step S605 by the number of data pieces used in the calculation of the integrated value, and then a black reference level set in advance is subtracted from the average value. The result is then multiplied by the correction coefficient $\alpha$ determined in step S604, thus obtaining the correction value for that row.

$$\text{correction value } V_i = \alpha \times (S_i/\text{number of data pieces} - \text{black reference value}) \quad (1)$$

Then, in step S607, correction is performed on an effective pixel unit in the i-th row in accordance with Expression (2), with use of the correction value $V_i$.

$$\text{corrected pixel signal } x'(j,i) = \text{pixel signal } (j,i) - \text{correction value } V_i \text{ (j being a horizontal coordinate)} \quad (2)$$

The processing for the row ends when the effective pixel signal correction calculation has been performed through to the end of the row. Processing then returns to step S605, and this processing is repeated through to the last row of the image (step S608).

Performing the processing described above, a correction value that reflects the state of random noise in an image is determined, which enables the execution of stripe noise correction without newly increasing the amount of noise. In other words, when there is a large amount of random noise in an image, correction is not performed, or processing in which the correction amount is reduced by reducing the correction coefficient is executed, thus enabling the execution of stripe noise correction without newly increasing the amount of noise. The reason for this is that a situation in which the amount of noise is newly increased often occurs in the case in which the correction value is larger than the proper correction value, and due to a large amount of random noise, and the present embodiment solves this issue.

Note that although an integrated value of the HOB is calculated using only the signals of pixels in rows on which correction is to be performed in step S605 in the present embodiment, the integrated value may be calculated using several rows of HOB pixels in higher/lower rows. Also, occasionally there are cases in which a pixel with an abnormally high or low signal exists. A more proper correction value can be calculated by adding processing such as clipping such a pixel to a certain level before calculating the integrated value, or not using (skipping) such a pixel in the calculation of the integrated value.

Also, although a description is given in the present embodiment in which correction processing is performed after acquiring an image, such processing may be performed in the AFE 102 at the same time as readout.

Embodiment 2

Figure 7:
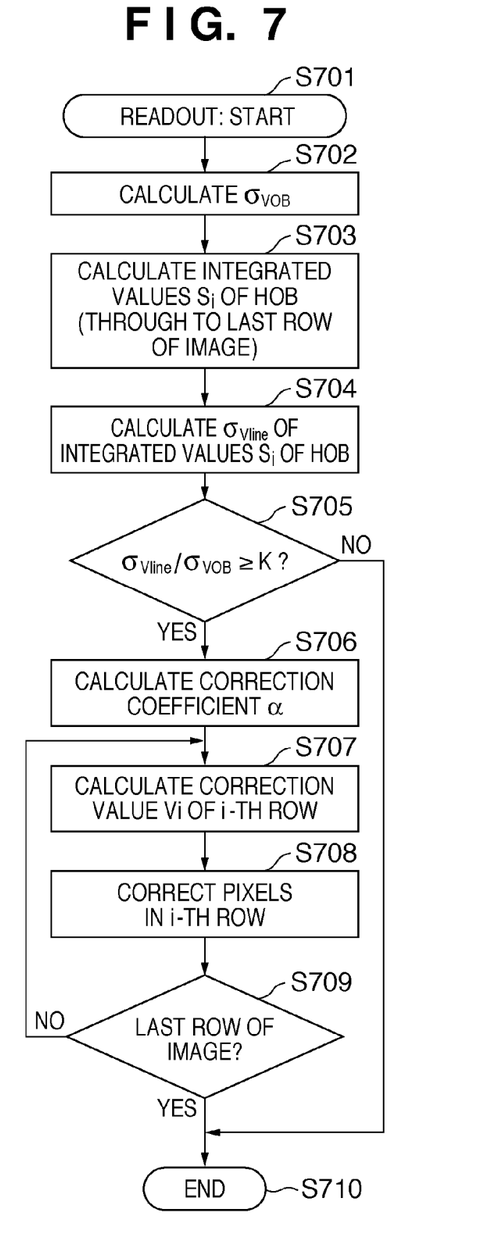
FIG. 7 is flowchart of horizontal stripe noise correction processing according to Embodiment 2 of the present invention.

The following describes Embodiment 2 of the present invention with reference to the flowchart shown in FIG. 7. Note that the processing up to and including the acquisition of an image that has not been developed yet is similar to that in Embodiment 1, and therefore a description thereof has been omitted.

First, readout is started in step S701. Similarly to Embodiment 1, the readout is performed from left to right row-by-row, starting at the upper left of the pixel configuration layouts shown in FIGS. 5 and 9. Next, the standard deviation $\sigma_{VOB}$ of pixel signals output from the VOB area is calculated (step S702). Similarly to Embodiment 1, although the pixel area targeted for calculation may be any area as long as OB pixels are included, it is better for the calculation to be performed using as many pixels as possible in order to properly determine the state of the image.

Next, in step S703 the integrated value $S_i$ of pixel signals output from the HOB pixels in the i-th row is calculated (i being a vertical coordinate, for example, i=0,1,2, . . . ,n). Note that in order to prevent abnormal data from being used in the integrated value calculation, for example, if a pixel signal is higher than the black reference level ±256, the pixel signal is clipped to the black reference level +256, and if lower than the black reference level ±256, the pixel signal is clipped to the black reference level −256. The integrated value $S_i$ is held in a memory, and integrated value calculation is executed through to the last row of the image. Also, although an integrated value is calculated for a row of HOB pixels regardless of the output path or color in order to simplify the description here, the pixel signals may be demultiplexed into channels before executing the integrated value calculation. Also, in the calculation of the integrated value $S_i$ of the pixel signals output from the HOB pixels in the i-th row, not only the pixel signals output from the HOB pixels in the i-th row, but also signals output from HOB pixels in several higher/lower rows may be used.

In step S704, a standard deviation $\sigma_{Vline}$ of integrated values from S0 to Sn of the pixel signals output from the HOB that were calculated in step S703 is obtained (fourth calculation step). Next, a determination is made as to whether correction is to be performed (step S705), based on the value of $\sigma_{VOB}$ obtained in step S702 and the value of $\sigma_{Vline}$ obtained in step S704. The calculation $\sigma_{Vline/\sigma VOB}$ is performed, and if the result is greater than or equal to a determination value K, processing proceeds to step S706, and correction is executed. If the result is less than the determination value K, processing proceeds to step S710, and correction is not executed. Here, $\sigma_{Vline}$ reflects the magnitude and amount of stripe noise in the image, and if $\sigma_{Vline}$ is approximately greater than or equal to 0.1 times $\sigma_{VOB}$, which reflects the random noise component of the image, stripe noise can be confirmed visually as well, and therefore correction is executed. On the other hand, if $\sigma_{Vline}$ is less than 0.1 times $\sigma_{VOB}$, the stripe noise is not prominent. In this case, correction is not executed since there is the risk of undesirably creating stripe noise if correction is executed.

In the case of executing correction, first the correction coefficient α is determined according to the value of $\sigma_{VOB}$ (step S706). The correction coefficient is calculated similarly to as in Embodiment 1. Next, in step S707 the correction value $V_i$ for the i-th row is determined (i being a vertical coordinate). The correction value is calculated in accordance with Expression (1) shown in Embodiment 1. Specifically, an average value is calculated by dividing the integrated value calculated in step S704 by the number of data pieces used in the calculation of the integrated value, and then a black reference level set in advance is subtracted from the average value. The result is then multiplied by the correction coefficient α determined in step S706, thus obtaining the correction value for that row.

Then, in step S708, correction is performed on an effective pixel unit in the i-th row in accordance with Expression (2), with use of the correction value $V_i$.

The processing for the row ends when the effective pixel signal correction calculation has been performed through to the end of the row. Processing then returns to step S707, and this processing is repeated through to the last row (step S709).

By performing the processing described above, the correction amount is adjusted in consideration of the magnitude of random noise similarly to Embodiment 1, thus enabling performing horizontal stripe noise correction without newly increasing the amount of noise. Furthermore, since the state of horizontal stripe noise in an image is determined before correction is performed, unnecessary processing is prevented from being performed when the amount of stripe noise is small with respect to the image (in other words, is not prominent).

Embodiment 3

Figure 8:
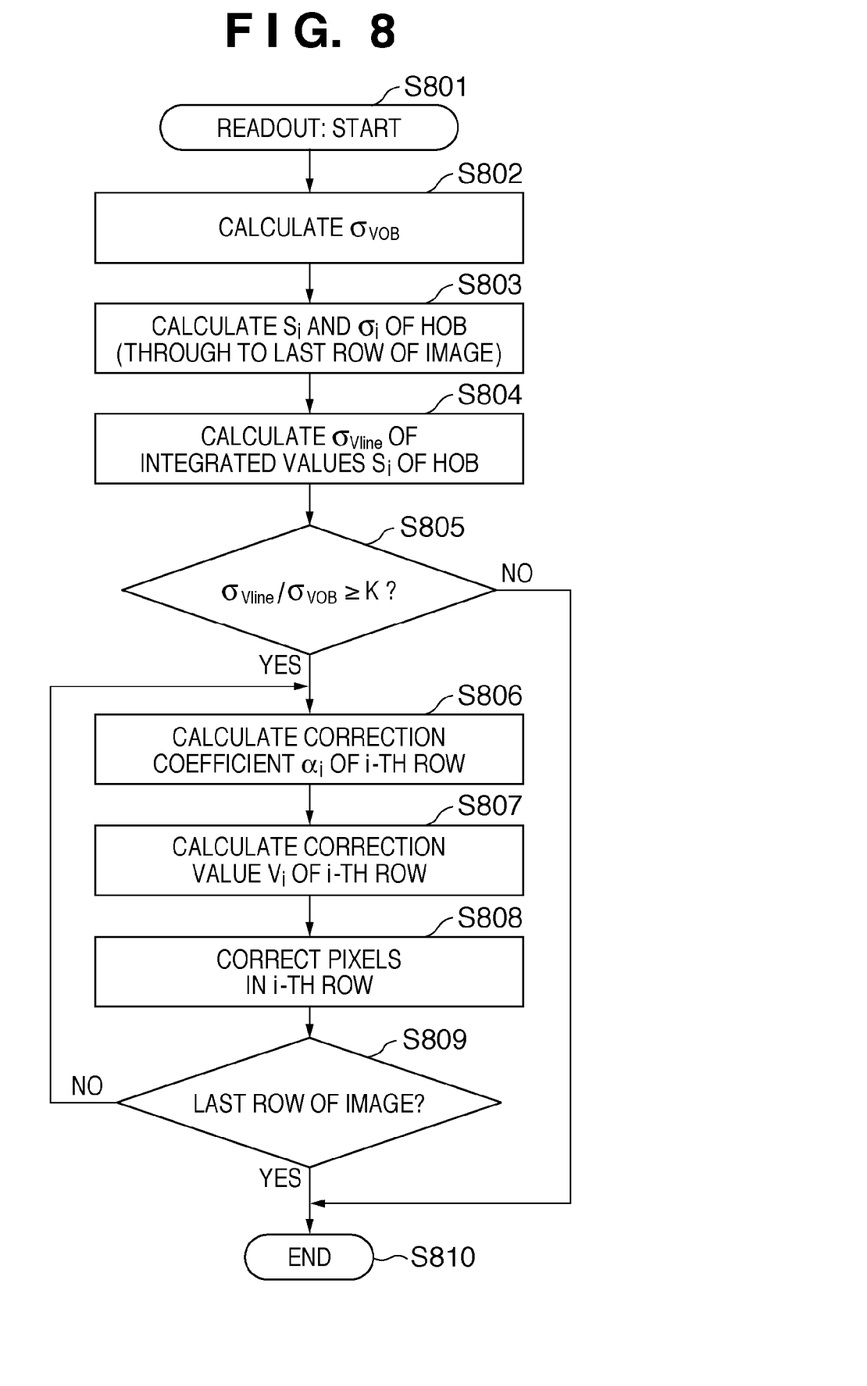
FIG. 8 is flowchart of horizontal stripe noise correction processing according to Embodiment 3 of the present invention.

The following describes Embodiment 3 of the present invention with reference to the flowchart shown in FIG. 8. Note that the processing up to and including readout for all pixels is similar to that in Embodiment 1. Also, the processing up to and including the determination of whether to execute correction is substantially the same as in Embodiment 2.

First, readout is started in step S801. Similarly to Embodiment 1, the readout is performed from left to right row-by-row, starting at the upper left of the pixel configuration layouts shown in FIGS. 5 and 9. Next, the standard deviation $\sigma_{VOB}$ of pixel signals output from the VOB area is calculated (step S802). Similarly to Embodiment 1, although the pixel area targeted for calculation may be any area as long as OB pixels are included, it is better for the calculation to be performed using as many pixels as possible in order to properly determine the state of the image.

Next, in step S803 the integrated value $S_i$ and standard deviation $\sigma_i$ of pixel signals output from HOB pixels in the i-th row are calculated (i being a vertical coordinate, for example, i=0,1,2, . . . ,n). Note that in order to prevent abnormal data from being used in the calculation of the integrated value and the standard deviation, for example, if a pixel signal is higher than the black reference level ±256, the pixel signal is clipped to the black reference level +256, and if lower than the black reference level ±256, the pixel signal is clipped to the black reference level −256. The integrated value $S_i$ and the standard deviation $\sigma_i$ are held in a memory, and the integrated value calculation is executed through to the last row of the image. Also, although an integrated value is calculated for a row of HOB pixels regardless of the output path or color in order to simplify the description here, the pixel signals may be demultiplexed into channels before executing the integrated value calculation. Also, in the calculation of the integrated value $S_i$ and the standard deviation $\sigma_i$ of signals of the i-th row, not only the pixel signals output from the HOB pixels in the i-th row, but also signals output from HOB pixels in several higher/lower rows may be used.

In step S804, the Sn standard deviation $\sigma_{Vline}$ is obtained from the integrated values S0 of the pixel signals output from the HOB that were calculated in step S803. Next, a determination is made as to whether correction is to be performed (step S805), based on the value of $\sigma_{VOB}$ obtained in step S802 and the value of $\sigma_{Vline}$ obtained in step S804. The calculation $\sigma_{Vline}/\sigma_{VOB}$ is performed, and if the result is greater than or equal to the determination value K, processing proceeds to step S806, and correction is executed. If the result is less than the determination value K, processing proceeds to step S810, and correction is not executed.

In the case in which correction is to be executed, processing proceeds to step S806. A correction coefficient $\alpha_i$ is calculated for each row to be corrected (i being a vertical coordinate, for example, i=0,1,2, ... ,n). The correction coefficient $\alpha_i$ for the i-th row is calculated using $\sigma_i$ that was calculated in step S803. If $\sigma_i$ is high, the degree of reliability is low since the integrated value $S_i$ of HOB pixels in the i-th row has been calculated using pixel data that includes a large amount of variation. For this reason, the correction coefficient $\alpha_i$ is set to a low value. On the other hand, if $\sigma_i$ is low, the degree of reliability is high since the integrated value $S_i$ of HOB pixels in the i-th row has been calculated using pixel data that includes little variation. For this reason, the correction coefficient $\alpha_i$ is set to 1, or a number less than 1, but close to 1. The correction coefficient $\alpha_i$ for the i-th row may be determined using a table with respect to $\sigma_i$, and furthermore a configuration is possible in which $\sigma_{VOB}$ is added as a parameter, and the coefficient $\alpha_i$ for the i-th row is determined using a function of $\sigma_i$ and $\sigma_{VOB}$. Examples of the function for calculating the correction coefficient include Expressions (3) and (4).

$$\text{correction coefficient } \alpha_i = \beta \times \sigma_{VOB}/\sigma_i \quad (3)$$

$$\text{correction coefficient } \alpha_i = \beta \times \sigma_{VOB}/\sqrt{\sigma_i} \quad (4)$$

Here, $\beta$ is a constant that is determined arbitrarily. Also, in the case in which the value calculated using Expression (3) or (4) exceeds 1, the correction coefficient $\alpha_i$ is set to 1 since there is the risk of over-correction if the correction coefficient exceeds 1. Note that the expression for calculating the correction coefficient in the present embodiment is merely an example, and the present invention is not limited to this.

Next, in step S807 the correction value $V_i$ for the i-th row is determined (i being a vertical coordinate, for example, i=0,1, 2, ... n). The correction value is calculated in accordance with Expression (5). Specifically, an average value is calculated by dividing the integrated value calculated in step S803 by the number of data pieces used in the calculation of the integrated value, and then a black reference level set in advance is subtracted from the average value. The result is then multiplied by the correction coefficient $\alpha_i$ determined in step S806, thus obtaining the correction value for that row.

$$\text{correction value } V_i = \alpha_i \times (S_i/\text{number of data pieces} - \text{black reference value}) \quad (5)$$

Then, in step S808, correction is performed on an effective pixel unit in the i-th row in accordance with Expression (2), with use of the correction value $V_i$.

The processing for the row ends when the effective pixel signal correction calculation has been performed through to the end of the row. Processing then returns to step S806, and this processing is repeated through to the last row (step S809).

By performing the processing described above, a correction value that reflects the variation in signals of the HOB pixels in the row is determined, thus enabling executing stripe noise correction without newly increasing the amount of noise. Note that the above processing may be performed on a PC (Personal Computer) instead of in a camera. It should also be noted that although examples are given in the embodiments described above in which the reference pixel areas have the same structure as the aperture pixel area and are shielded, the present invention is not necessarily limited to this. For example, the reference pixels included in the reference pixel areas do not need to include photodiodes. In such a case, the reference pixels do not need to be shielded.

As described above, according to the above embodiments, a determination is made as to whether correction is to be performed, based on the value of the standard deviation of pixel signals that is a reference, thus enabling suppressing the occurrence of new stripe noise in an image due to over-correction. Also, horizontal stripe noise can be effectively corrected by changing the correction coefficient according to the value of the standard deviation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-114979, filed May 11, 2009, which is hereby incorporated by reference herein in its entirety.

The invention claimed is:

1. An image capturing apparatus comprising:
    an image sensor having an effective pixel area composed of effective pixels that photoelectrically convert an object image, and a reference pixel area composed of reference pixels that output pixel signals to be a reference;
    a first calculation unit configured to calculate values of a statistical measure of the pixel signals output from the reference pixel area;
    a second calculation unit configured to calculate integrated values with respect to each of rows of the pixel signals output from the reference pixel area;
    a third calculation unit configured to calculate correction values with respect to each of the rows by multiplying correction coefficients to the integrated value for each of the rows, wherein the correction values are calculated based on the values of the statistical measure;
    a correction unit configured to correct pixel signals with respect to each of the rows output from the effective pixel area with use of the correction values for each of the rows; and
    a determination unit configured to determine whether correction is to be performed by the correction unit, in accordance with the values of the statistical measure.

2. The image capturing apparatus according to claim 1, wherein the reference pixel area is an optical black area composed of shielded pixels that are shielded such that light does not enter.

3. The image capturing apparatus according to claim 1, wherein the values of a statistical measure are standard deviations.

4. A control method for an image capturing apparatus provided with an image sensor having an effective pixel area composed of effective pixels that photoelectrically convert an object image, and a reference pixel area composed of reference pixels that output pixel signals to be a reference, the control method comprising the steps of:
    calculating values of a statistical measure of the pixel signals output from the reference pixel area;
    calculating integrated values with respect to each of rows of the pixel signals output from the reference pixel area;
    calculating correction values with respect to each of the rows by multiplying correction coefficients to the integrated value for each of the rows, wherein the correction values are calculated based on the values of the statistical measure;
    correcting the pixel signals with respect to each of the rows output from the effective pixel area with use of the correction values for each of the rows; and
    determining whether correction is to be performed in the correction step, according to the values of the statistical measure.

5. A control method according to claim 4, wherein the values of a statistical measure are standard deviations.

* * * * *